US006073913A

United States Patent [19]

Chapman

[11] Patent Number: 6,073,913

[45] Date of Patent: Jun. 13, 2000

[54] HYDRAULIC VALVE FOR A CAMERA DOLLY

[75] Inventor: Leonard T. Chapman, North Hollywood, Calif.

[73] Assignee: Chapman/Leonard Studio Equipment, North Hollywood, Calif.

[21] Appl. No.: 09/055,080

[22] Filed: Apr. 3, 1998

[51] Int. Cl.[7] .......... B60P 1/48

[52] U.S. Cl. .......... 254/8 R; 254/2 R; 254/8 B; 254/124; 74/89.21; 74/527

[58] Field of Search .......... 254/8 R, 93 R, 254/8 B; 74/89.21, 527

[56] References Cited

U.S. PATENT DOCUMENTS

| | | | |
|---|---|---|---|
| 2,616,768 | 11/1952 | Stemm . | |
| 2,829,536 | 4/1958 | Lynch | 74/527 |
| 3,168,284 | 2/1965 | Fisher | 254/8 R |
| 3,915,429 | 10/1975 | Zelli | 254/8 R |
| 4,109,678 | 8/1978 | Chapman . | |
| 4,360,187 | 11/1982 | Chapman | 254/8 R |
| 4,747,424 | 5/1988 | Chapman . | |
| 4,950,126 | 8/1990 | Fabiano et al. . | |
| 5,037,068 | 8/1991 | Grottesi | 254/8 R |
| 5,460,059 | 10/1995 | Kato | 74/89.21 |
| 5,482,085 | 1/1996 | Wasson . | |
| 5,738,631 | 4/1998 | Konstorum | 74/527 |
| 5,771,933 | 6/1998 | Akamatsu et al. . | |

*Primary Examiner*—David A. Scherbel
*Assistant Examiner*—Lee Wilson
*Attorney, Agent, or Firm*—Lyon & Lyon LLP

[57] ABSTRACT

An improved hydraulic valve for a camera dolly includes Teflon inserts around a valve pin to reduce vibration and noise. The ratio of movement between the boom control, which controls the up and down movement of the arm on the camera dolly, and opening and closing of the hydraulic valve, is increased to reduce the sensitivity of the valve to boom control movement. The boom control includes ready up and ready down detents which provide the user a tactile indication of where to position the boom control for immediate up or down movement.

3 Claims, 6 Drawing Sheets

Fig. 3
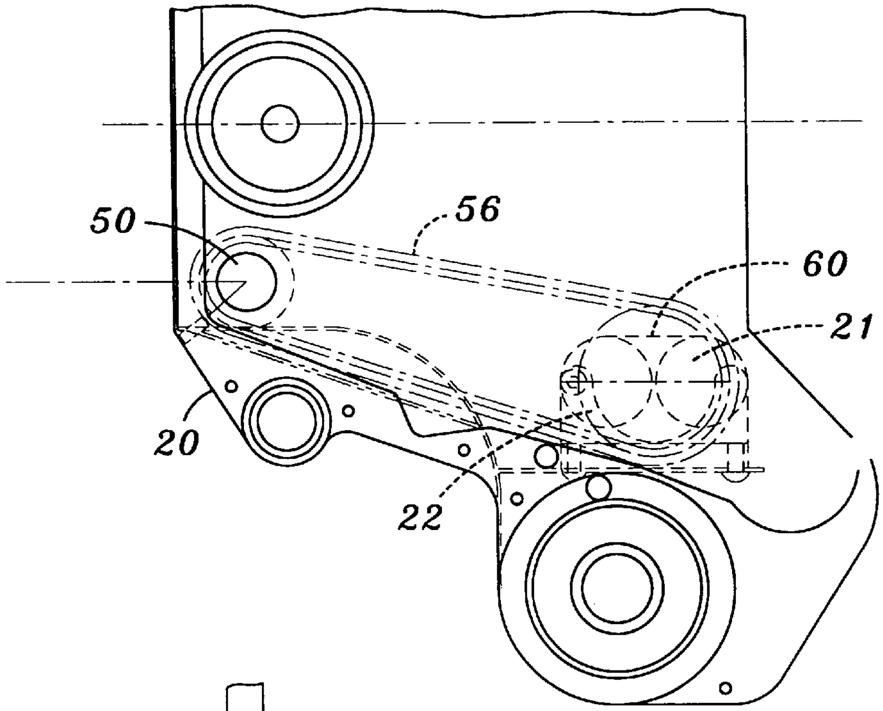
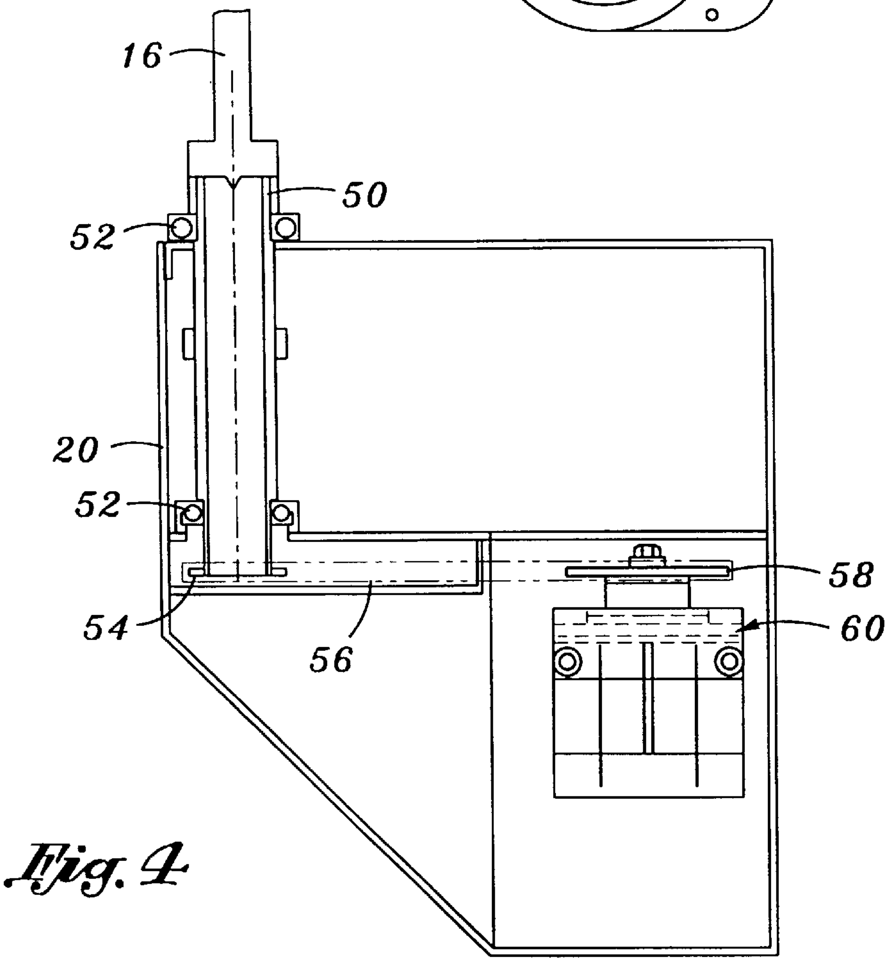
Fig. 4

HYDRAULIC VALVE FOR A CAMERA DOLLY

FIELD OF THE INVENTION

The field of the invention is hydraulic valves. More particularly, the invention relates to hydraulic valves used in camera dollies, to raise and lower a camera.

Camera dollies are used in the television and motion picture industries to support and maneuver a camera. Typically, the camera dolly is on wheels and has an arm to raise and lower the camera. The camera dolly is generally moved by dolly operators or "grips", to properly position the camera, to follow the film or video sequence.

Various designs have been used to raise and lower a camera on a camera dolly. For example, U.S. Pat. No. 4,360,187 describes a two piece arm design for use in a camera dolly. The arm is raised and lowered via a hydraulic actuator and a control valve. Other camera dollies use a straight single piece beam arm or a telescoping pedestal lifted by a hydraulic or pneumatic actuator, such as described in U.S. Pat. No. 5,516,070.

The valves used to control a hydraulically driven camera dolly arm should meet certain design objectives. For example, the opening and closing characteristics of the valve should allow the camera dolly operator to accurately and easily control the speed and direction of the arm movement. The valve should also allow the arm to be accurately stopped at a selected elevation. In addition, the valve should operate silently, so as not to interfere with the sound track being recorded for the motion picture or video sequence.

U.S. Pat. Nos. 4,747,424 and 4,109,678, incorporated herein by reference, describe hydraulic valves which have been successfully used in camera cranes and dollies for many years. However, the valve described in U.S. Pat. No. 4,109,678 will occasionally generate fluid rushing or whistling sounds, especially on the "down" side, as hydraulic fluid rapidly flows through the valve, when the camera dolly arm is quickly lowered. In addition, controlling this valve to begin movement of the camera dolly arm at a precise time can require a level of skill and experience, as the control handle must be turned by a certain amount before the camera dolly arm actually begins to move. The delay between control handle movement and arm movement results because the swash plate in the valve must turn sufficiently, before the valve cracks open. This characteristic can make precise control of the movement of the camera dolly arm more difficult. As split second timing is often needed to position a camera, the delay in arm movement can be a disadvantage. The delay may also induce less experienced grips to over-compensate by turning the control handle too far. This results in arm movement that is too fast, or that overshoots the desired camera lens height.

Accordingly, there remains a need for an improved hydraulic valve to control movement of a hydraulically actuated camera dolly arm.

SUMMARY OF THE INVENTION

To these ends, in a first aspect of the invention, an improved hydraulic valve has a head bushing positioned around the head of the valve pin on the down side of the valve.

In a second aspect of the invention, a shaft bushing is located around the shaft of the pin on the down side of the valve.

In a third aspect of the invention, a detent provides for instant down movement, closed, and instant up movement positions for the valve control.

In another separate aspect of the invention, the ratio of movement between the valve control and the valve is selected to provide desensitized control of the valve, and therefore of the camera dolly arm, thereby making the arm easier to precisely control. Accordingly, it is an object of the invention to provide an improved hydraulic valve for a camera dolly.

BRIEF DESCRIPTION OF THE DRAWINGS

Other objects and features of the invention will become apparent from the following detailed description taken in connection with the accompanying drawings. It is to be understood, however, that the drawings are designed for the purpose of illustration only and are not intended as a definition of the limits of the invention.

In the drawings, wherein similar reference characters denote similar elements throughout the several view:

FIG. 3 is a partial plan view thereof;

FIG. 4 is a side elevation thereof, in part section;

DETAILED DESCRIPTION OF THE DRAWINGS

Figure 1:
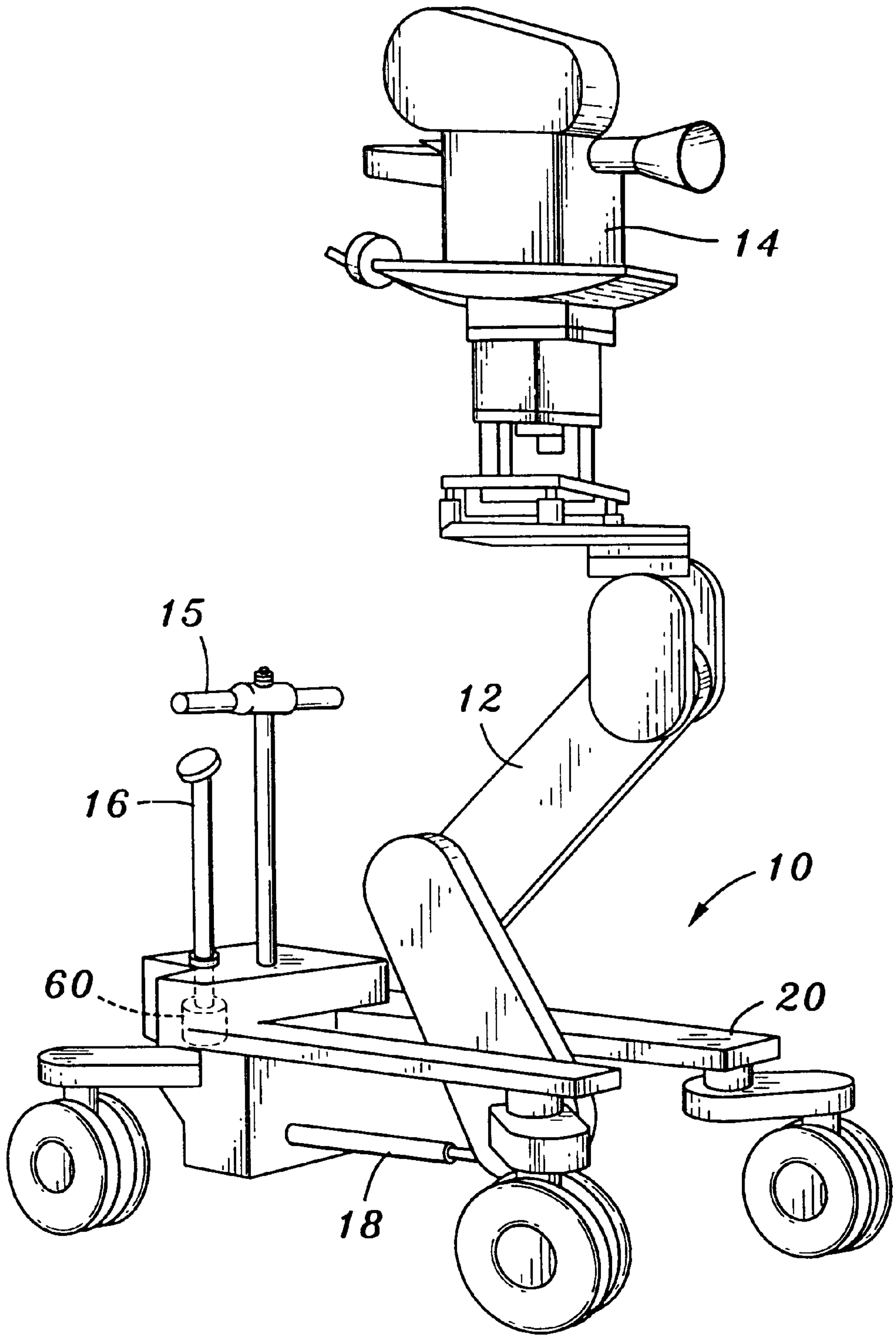
FIG. 1 is a perspective view of a camera dolly.
Figure 2:
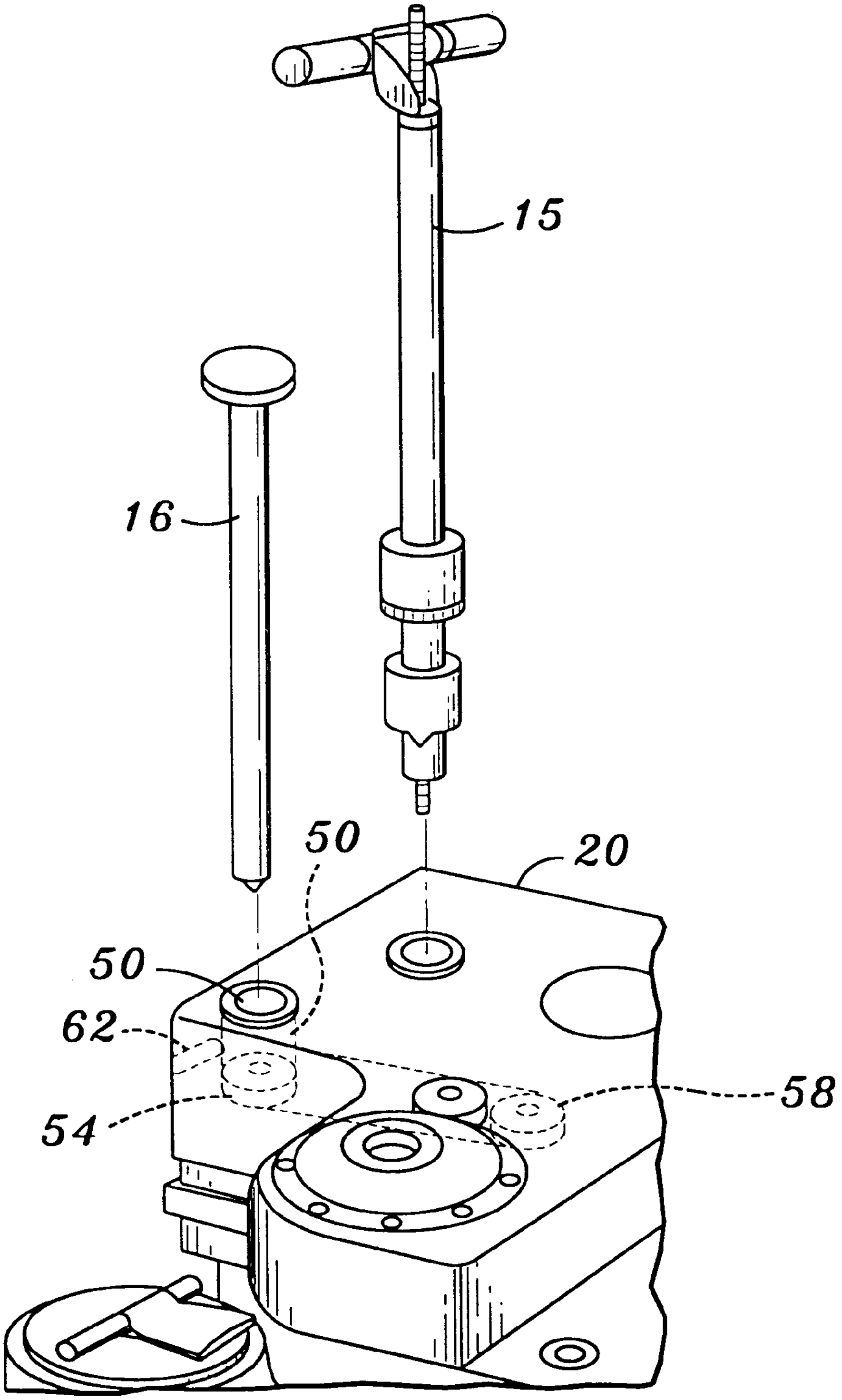
FIG. 2 is an enlarged perspective view of the back end of the camera dolly of FIG. 1, containing the present hydraulic valve.

Turning now in detail to the drawings, as shown in FIGS. 1 and 2, a camera dolly 10 has an arm 12 supporting a motion picture or video camera 14. A boom or arm control 16 at the back of the camera dolly 10 is turned to open and close a hydraulic valve 60, to raise and lower the arm 12. The hydraulic valve 60 controls the flow of hydraulic fluid to a hydraulic actuator 18 extending from the chassis 20 of the dolly 10 to the arm 12. A steering bar 15 at the back end of the dolly 10 is used to steer the wheels of the dolly, and to shift between different steering modes.

Figure 5:
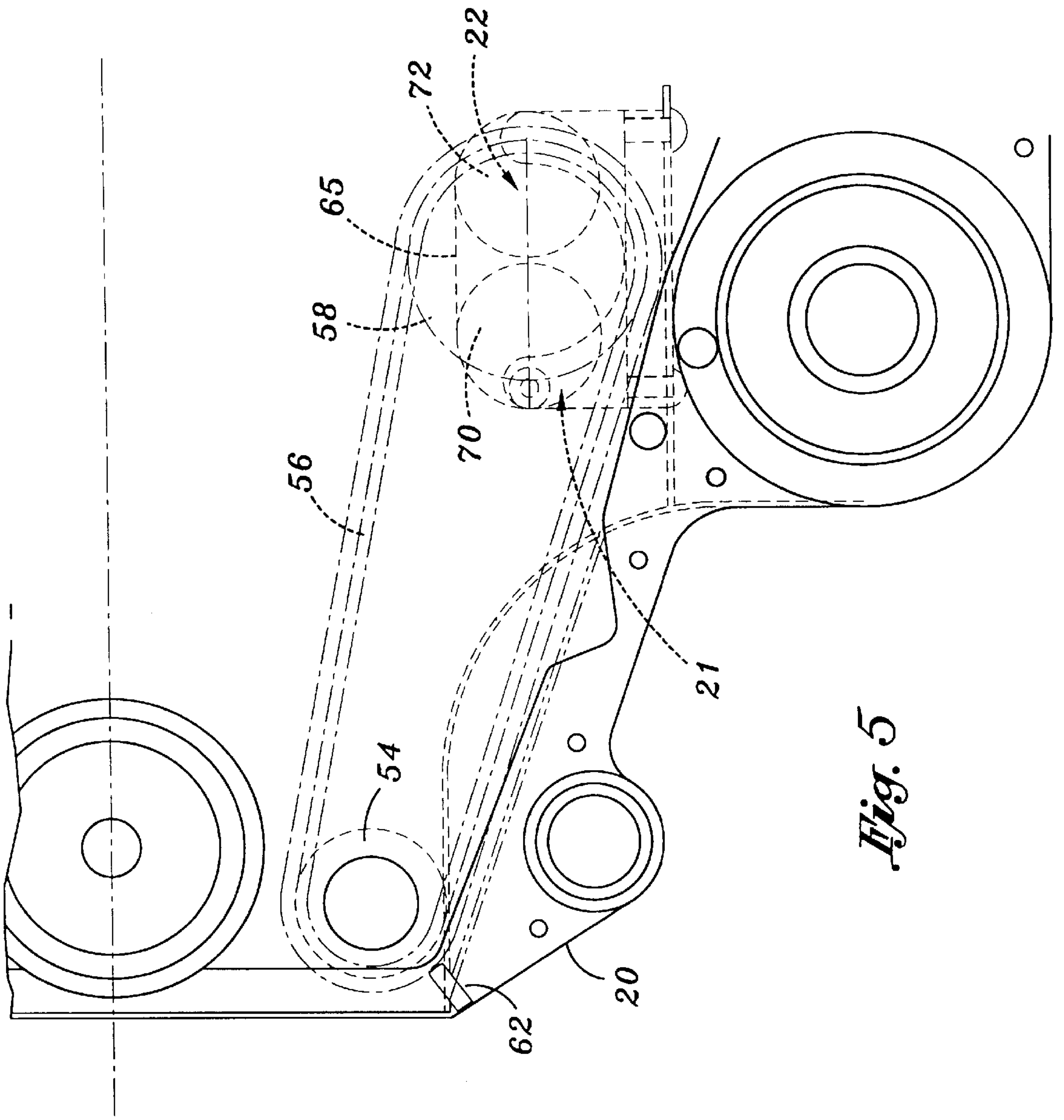
FIG. 5 is an enlarged partial plan view of the back right side of the camera dolly shown in FIG. 1.

Referring to FIGS. 3, 4 and 5, a receiver tube 50 is rotatably mounted at the back end of the chassis 20 on bearings 52. The boom control 16 is irrotatably secured to the upper end of the receiving tube 50. A boom sprocket 54, preferably having 20 teeth is irrotatably attached to the bottom end of the receiver tube 50.

A hydraulic valve 60 is mounted within the chassis 20 in front of the receiver tube 50. A valve sprocket 58, preferably having 32 teeth, is attached on top of the valve 60. The valve sprocket 58 is linked to the boom sprocket 54 via a roller chain 56.

Figure 6:
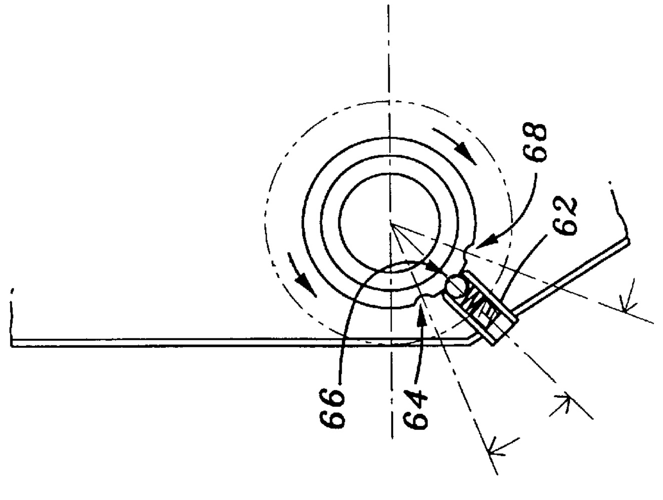
FIG. 6 is an enlarged plan view, in part section, showing details of the detent shown in FIG. 5.

Referring to FIGS. 5 and 6, the receiver tube 50 has three detent grooves or dimples: a down groove 64, a stop groove 66, and an up groove 68. A ball detent 62 on the chassis is positioned to engage these grooves.

Figure 7:
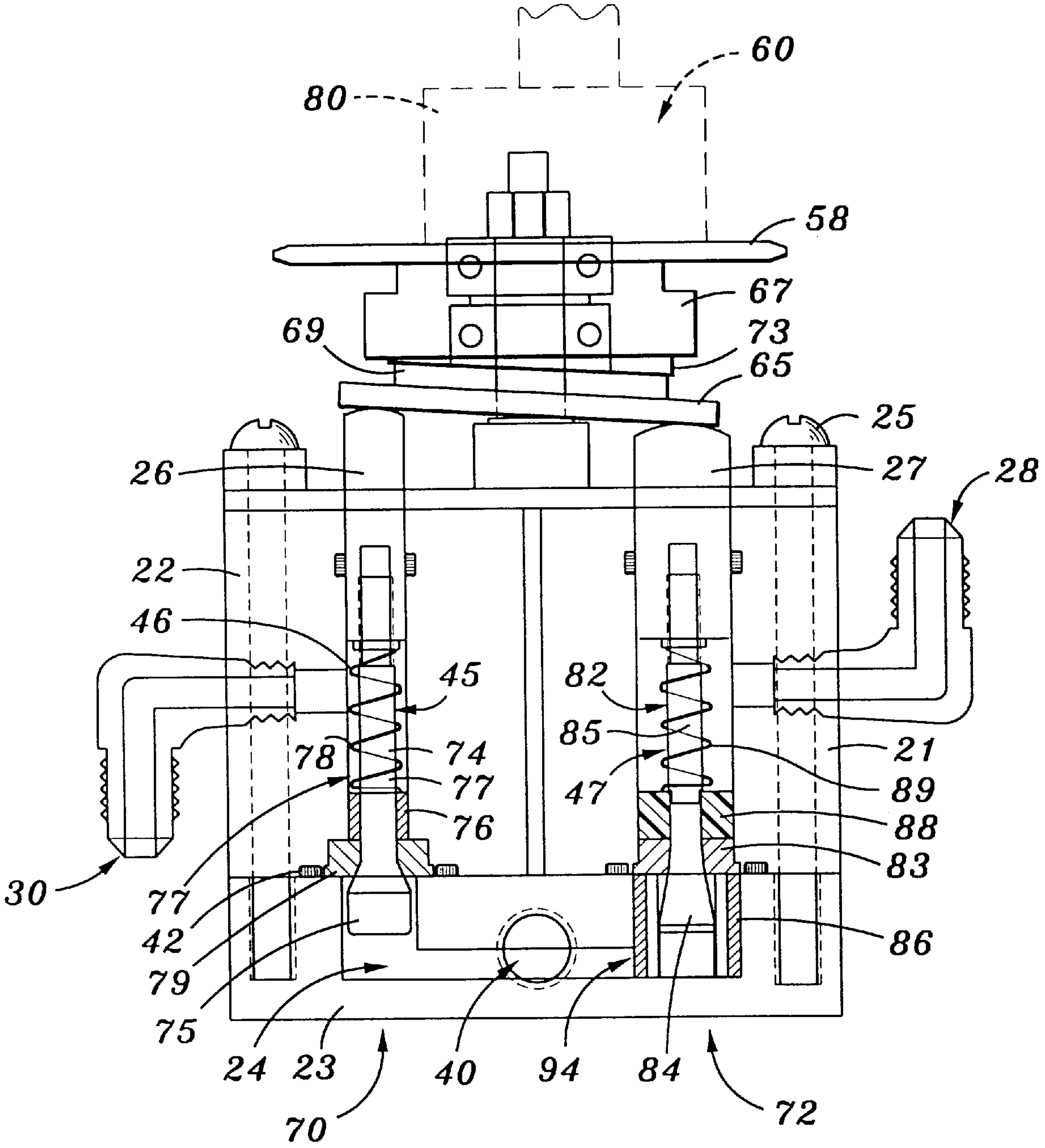
FIG. 7 is a side elevation view, in part section, of the hydraulic valve shown in FIGS. 3–5.

Referring to FIGS. 5 and 7, the hydraulic valve 60 has a valve body 22 generally divided into an up side 70 and a down side 72. A valve base 23 is bolted onto the valve body 22. A port 40 extending into the valve base 23 connects to a passageway 24 leading into an up bore 45, which connects to an up outlet 30 extending out of the valve body 22.

Similarly, on the down side 72 of the valve 60, the port 40 extends through the passageway 24 to a down bore 47 in the down valve body 21. A return port 28 extends through the down valve body 21 and joins into the down bore 47. The junctions between the passageway 24 in the valve base 23 and the up bore 45 and down bore 47 in the down valve bodies 21 and 22 are sealed by O rings 42, compressed by bolts 25 clamping the valve body and valve base together.

An up pin 74 is centered in position within the up bore 45 via a steel bushing 76 (which is preferably pressed into the up bore 45.) The bushing 76 and the shaft 77 of the up pin 74 are dimensioned to create a small annular opening around the shaft for hydraulic fluid passage. The upper end of the shaft 77 of the up pin 74 is threaded into a piston 26 which bears against a swash plate 65 which reacts against a Teflon washer 69 over the swash plate 65. The valve sprocket 58 is attached to and rotates with a cam 67. The Teflon washer 69 is sandwiched between the swash plate 65 and the eccentric bottom surface 73 of the cam 67. As the cam turns, it depresses either of the pistons 26 and 27. Alternatively, a glass filled Teflon washer or a needle bearing plate may be used in place of the Teflon washer 69, for faster valve response. The swash plate 65 generally does not turn with the valve sprocket 58. The lower end of a compression spring 46 rests on the bushing 76 with the upper end of the compression spring 46 pushing on the piston 26. A steel valve seat 79 in the valve body 22 seals the up bore 45 closed when the head 75 of the up pin 74 engages the seat 79.

Figure 9:
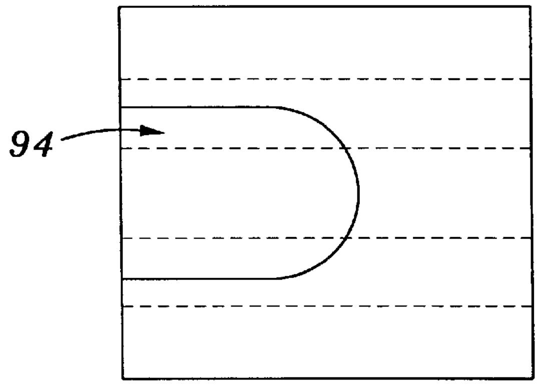
FIG. 9 is a side elevation view thereof.
Figure 8:
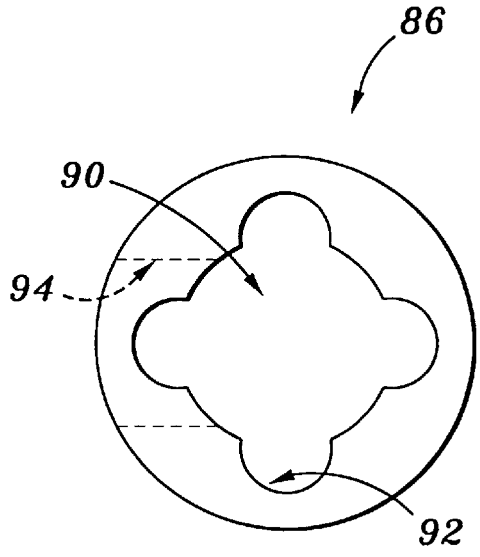
FIG. 8 is a plan view of the head insert shown in FIG. 7.
Figure 11:
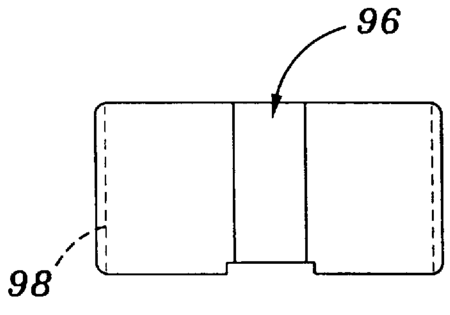
FIG. 11 is a side elevation view thereof (rotated 90°).

On the down side 72 of the hydraulic valve 60, a head insert 86, as shown in FIGS. 8 and 9, is pressed into the valve base 23. A head bore 90 extends through the head insert 86. The head bore 90 connects to the passageway 24 through a cutout 94 in the side cylindrical surface of the head insert 86. As shown in FIG. 8, side channels 92 extend through the head insert 86. The head bore 90 is dimensioned to closely fit around the head 84 of the down pin 82. A steel valve seat 83 is positioned in the valve body 22 above the head insert 86.

Figure 10:
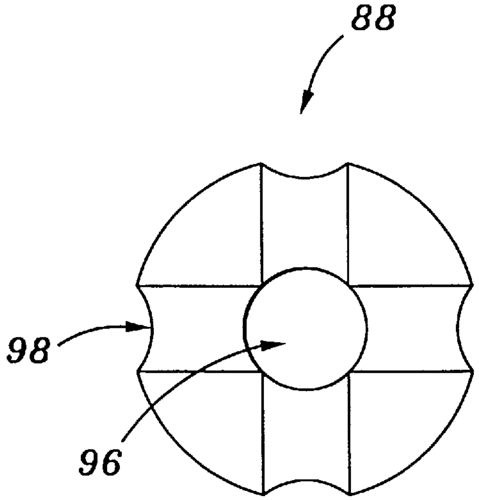
FIG. 10 is a plan view of the shaft insert shown in FIG. 7.

Referring to FIG. 7, a shaft insert 88 is pressed into the down bore 47, above the valve seat 83. The shaft insert 88, as shown in FIGS. 10 and 1, has a through bore 96, dimensioned to closely fit around the shaft 85 of the down pin 82. Grooves 98 on the outside of the shaft insert 88 allow hydraulic fluid to flow through the down bore 80 past the shaft insert 88. A piston 27 is threaded onto the upper end of the shaft 85 of the down pin 82. A spring 89 biases the down pin 82 upwardly with the piston 27 bearing against the swash plate 65.

As best shown in FIG. 5, the boom sprocket 54 is smaller than the valve sprocket 58. In the preferred embodiment, the boom sprocket 54 has 20 teeth and the valve sprocket 58 has 32 teeth. This provides a 1:1.6 ratio between turning movement of the boom control 16 and turning movement of the valve sprocket 58 and the cam 67. In prior designs, a 1:1 ratio was used, making the valve highly sensitive to movement of the boom control 16, so that even a slight movement of the boom control 16 would result in a rapid movement of the arm 12. The design shown in FIG. 5 makes operation of the dolly easier because more turning movement of the boom control 16 is needed to actuate the valve 60 and cause the arm 12 to move. As a result, the operator can more easily avoid camera positioning errors caused by the arm moving too fast or too slow. The design shown in FIG. 5 provides about 72° of boom control movement from the full speed up or down position to the stop position, in contrast to about a 45° range of movement in previous camera dollies.

In use, hydraulic lines are connected to the down outlet 28, up outlet 30 and to the port 40, to connect the valve 60 into the hydraulic system of the camera dolly 10. To raise the arm 12 of the camera dolly 10, the boom or arm control 16 is turned counterclockwise (when viewed from above as in FIG. 6). The boom control turns the receiver tube 50, and the boom sprocket 54 on the receiver tube 50. Consequently, the valve sprocket 58 turns in the same direction, and by about 62% (20 teeth/32 teeth=62%) of the amount as the boom control 16, driven by the chain 56 connecting the valve sprocket 58 to the boom sprocket 54. As the valve sprocket 58 turns, the swash plate pushes down on the piston 26 causing the head 75 of the up pin 74 to move away from the seat 79. The up side 70 of the hydraulic valve 60 is then opened, allowing hydraulic fluid to flow through the port 40, the passageway 24, through the annular space between the bushing 76 and shaft 77 of the up pin 74, through the up bore 78, and out through the up outlet 30, to drive the hydraulic actuator 18 up and raise the arm 12.

Lowering the arm is performed by turning the boom control clockwise, opening the down side of the valve, and allowing hydraulic fluid to return from the actuator, through the down bore 47, through the side channels 92 in the head insert 86, through the grooves 98 on the shaft insert 88, out of the return port 28, to a sump or reservoir.

Referring to FIGS. 2, 5–7, when the boom control 16 is turned to a position so that the detent 62 engages the stop groove 66, the swash plate 65 is positioned so that both pistons are up and both sides of the valve 60 are closed. Consequently, no hydraulic fluid can flow through the valve 60 and the arm 12 remains in a fixed position. When the boom control 16 is turned so that the detent 62 engages the up groove 68, the swash plate 65 is positioned so that the up side 70 of the hydraulic valve 60 is on the verge of opening. Further counter-clockwise turning of the boom control 16, even by a small amount, causes the up side 70 of the valve 60 to open, so that the arm 12 moves virtually simultaneously with the further turning movement of the boom control 16.

Similarly, when the boom control 16 is turned so that the detent 62 engages the down groove 68 in the receiver tube 50, the down side 72 of the hydraulic valve 60 is on the verge of opening. As the boom control 16 is turned further counter-clockwise, as shown in FIG. 6 the downside 72 of the valve 60 opens virtually simultaneously with the further turning movement. Accordingly, turning the boom control to engage the up groove 64 or down groove 68 provides a "up ready" and an "down ready" position, from which the operator knows that further movement of the boom control 16 will result in instantaneous movement of the arm 12.

In contrast, in previous camera dolly designs, substantial turning movement of the boom control was required to move the swash plate 65 to open the up or down side of the valve. This delay in the prior designs between turning the boom control and achieving arm movement made precise timing of arm movements difficult. The grooves 64–68 and detent 62 eliminate the delay and make precise timing of arm movements easier to achieve for the dolly operator.

When the receiver tube 50 is positioned with the detent 62 engaged into the down groove 68 or the up groove 64, no hydraulic fluid flows through the valve 60. The stop groove 66 is provided in between the up groove 64 and the down groove 68 as an additional tactile point of reference. The valve 60 remains closed at all angular positions of the receiver tube 50 between (and including) the down groove 68 and the up groove 64.

The arm 12 can move down rapidly, when the valve 60 is fully opened and the arm is carrying a heavy load. In existing designs, the down pin 82 will frequently vibrate due to the turbulent and rapid flow of hydraulic fluid around the down pin. This vibration creates unwanted noise. The head insert 86 and the shaft insert 88, preferably made of Teflon, largely prevent vibration of the down pin 82 and associated noise. Consequently, the valve 60 operates silently under virtually all conditions.

If a needle bearing 69 is used in place of a Teflon washer 69 between the swash plate 65 and the cam 67, the valve 60 may tend to close itself, when the operator releases the boom control knob, depending on the friction in the mechanical position, hydraulic pressure, and valve position. The up force on the pistons generated by hydraulic pressure and the springs 46 and 89, creates a certain level of closing torque on the cam 67 and sprocket 58. This torque will close the valve unless it is exceeded by the piston/swash plate; chain/sprocket; bearings; and o-ring friction forces. This self-closing can be prevented by increasing tension in the chain 56 which will increase the friction acting to prevent the cam 67 from turning. A viscous fluid 80 dampener may optionally also be linked to the swash plate, to provide a smooth and controlled closing movement of the valve.

Thus, a novel hydraulic valve for a camera dolly has been shown and described. Various modifications and substitutions of equivalents may of course be made without departing from the spirit and scope of the invention. The invention, therefore, should not be restricted, except by the following claims and their equivalents.

What is claimed is:

1. In a camera dolly of type having an arm raised and lowered by a hydraulic actuator, controlled by a turning a boom control which is linked to a hydraulic valve and with the valve controlling the flow of hydraulic fluid to and from the actuator, the improvement comprising:

a down detent slot in the boom control;

a closed detent slot in the boom control;

an up detent slot in the boom control; and a detent element on the camera dolly positioned to engage one of the detent slots and with movement of the boom control, in a direction, past the down detent slot causing a down channel in the valve to open and the arm to move down, and with movement of the boom control in a second direction, opposite to the first direction, past the up detent slot causing an up channel in the valve to open and the arm to move up, and with the up and down channels closed, and the arm remaining in position, when the detent element is in or between the down and up detent slots.

2. The camera dolly of claim 1 wherein the down detent slot is positioned on the boom control so that movement of the boom control in a direction to lower the arm results in substantially immediate downward arm movement at the instant the detent element is disengaged from the down detent slot.

3. The camera dolly of claim 1 wherein the up detent slot is positioned on the boom control so that movement of the boom control in a direction to raise the arm results in substantially immediate upward movement of the arm at the instant the detent element is disengaged from the up detent slot.

* * * * *